(12) United States Patent
Park et al.

(10) Patent No.: US 9,010,155 B2
(45) Date of Patent: Apr. 21, 2015

(54) LASER ANNEALING APPARATUS

(71) Applicant: Samsung Display Co., Ltd., Yongin, Gyeonggi-Do (KR)

(72) Inventors: Cheol-Ho Park, Yongin (KR); Byoung-Kwon Choo, Yongin (KR); Eun-Cheol Kim, Yongin (KR); Hee-Geun Son, Yongin (KR); Jong-Hyun Yun, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 210 days.

(21) Appl. No.: 13/889,152

(22) Filed: May 7, 2013

(65) Prior Publication Data

US 2014/0202213 A1    Jul. 24, 2014

(30) Foreign Application Priority Data

Jan. 22, 2013  (KR) .................. 10-2013-0007090

(51) Int. Cl.
*C01B 33/02* (2006.01)
*C01B 33/021* (2006.01)
*B23K 26/12* (2014.01)
*B23K 26/30* (2014.01)

(52) U.S. Cl.
CPC ............. *C01B 33/021* (2013.01); *B23K 26/128* (2013.01); *B23K 26/425* (2013.01)

(58) Field of Classification Search
USPC .................................................. 65/348, 355
See application file for complete search history.

(56) References Cited

U.S. PATENT DOCUMENTS

| 6,621,636 | B2 | 9/2003 | Tanaka et al. | |
| 6,815,377 | B2* | 11/2004 | Mitsuhashi et al. | 438/795 |
| 2012/0061678 | A1* | 3/2012 | Lim et al. | 257/72 |
| 2013/0186145 | A1* | 7/2013 | Nakamura et al. | 65/355 |
| 2013/0192310 | A1* | 8/2013 | Nakamura | 65/157 |

FOREIGN PATENT DOCUMENTS

| JP | 2000-12461 | 1/2000 |
| JP | 2002-76509 | 3/2002 |
| JP | 2002-261042 | 9/2002 |

* cited by examiner

*Primary Examiner* — Mark Halpern
(74) *Attorney, Agent, or Firm* — Christie, Parker & Hale, LLP

(57) ABSTRACT

A laser annealing apparatus includes a lens unit configured to transmit a laser beam to be irradiated onto an irradiation target; a lens unit housing accommodating the lens unit and having an opening configured to allow the laser beam to pass through the opening; a blocking plate configured to block at least a portion of the laser beam reflected by the irradiation target after being transmitted through the lens unit to the irradiation target; and a cooling unit between the blocking plate and the lens unit housing.

12 Claims, 6 Drawing Sheets

LASER ANNEALING APPARATUS

CROSS-REFERENCE TO RELATED PATENT APPLICATION

This application claims priority to and the benefit of Korean Patent Application No. 10-2013-0007090, filed on Jan. 22, 2013, in the Korean Intellectual Property Office, the disclosure of which is incorporated herein in its entirety by reference.

BACKGROUND

1. Field

Aspects of embodiments of the present invention relates to a laser annealing apparatus.

2. Description of Related Art

In general, in display devices such as thin film transistor (TFT) liquid crystal display (LCD) devices or active organic light-emitting display devices, emission of light from a pixel or an intensity of light emitted from a pixel is controlled by using a TFT electrically connected to the pixel. A TFT may have various configurations but may be configured to include an active layer by using polysilicon having a high mobility. To that end, a process of crystallizing amorphous silicon into polysilicon is used.

However, in a conventional laser annealing apparatus for crystallization of amorphous silicon, the accuracy of irradiating a laser beam is lowered during laser annealing.

SUMMARY

Aspects of embodiments of the present invention provides a laser annealing apparatus capable of minimizing or reducing an error rate due to a laser beam reflected during laser annealing. However, the present invention is not limited thereto.

According to an embodiment of the present invention, a laser annealing apparatus includes a lens unit configured to transmit a laser beam to be irradiated onto an irradiation target; a lens unit housing accommodating the lens unit and having an opening configured to allow the laser beam to pass through the opening; a blocking plate configured to block at least a portion of the laser beam reflected by the irradiation target after being transmitted through the lens unit to the irradiation target; and a cooling unit between the blocking plate and the lens unit housing.

The laser beam transmitted through the lens unit may be incident on the irradiation target at an incident angle other than 0°. Also, the blocking plate may be below the lens unit housing and may at least partially block the laser beam reflected by the irradiation target from proceeding toward the lens unit housing.

The cooling unit may include a fluidic channel having an inlet and an outlet.

The cooling unit may have a plate shape having an opening corresponding to the opening of the lens unit housing. Furthermore, the cooling unit may surface-contact the blocking plate at a side of the opening of the lens unit.

The cooling unit may include a housing contact unit protruding from edges of the cooling unit toward the lens unit housing and contacting the lens unit housing. The housing contact unit may surround the edges of the cooling unit. Also, the laser annealing apparatus may further include a purging line for purging a space between the cooling unit and the lens unit housing with a purging gas. In more detail, the purging line may purge the space between the cooling unit and the lens unit housing via the housing contact unit.

The laser annealing apparatus may further include a cooling unit location adjusting unit configured to adjust a location of the cooling unit to change the location of the opening of the cooling unit.

The cooling unit may contact a surface of the blocking plate facing the lens unit housing.

BRIEF DESCRIPTION OF THE DRAWINGS

The above and other features and aspects of the present invention will become more apparent by describing in more detail exemplary embodiments thereof with reference to the attached drawings in which.

DETAILED DESCRIPTION

Figure 1:
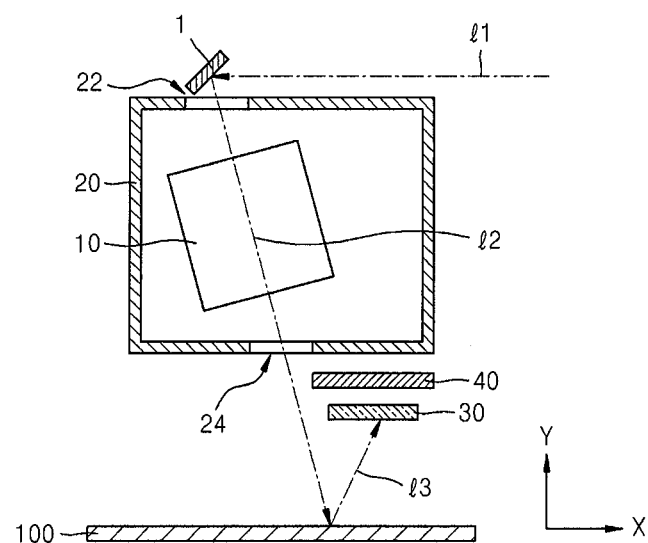
FIG. 1 is a schematic view of a laser annealing apparatus according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. The sizes of elements may be exaggerated in the drawings for convenience of explanation.

In the following description, x, y, and z axes are not limited to three axes in an orthogonal coordinate system, and may be interpreted in a broader sense. For example, the x, y, and z axes may be orthogonal or non-orthogonal to each other.

Also, sizes and thicknesses of elements in the drawings may be arbitrarily provided for convenience of explanation and thus do not restrict the scope of the present invention.

In the drawings, the thicknesses of layers and regions may be exaggerated for clarity. It will be understood that when an element, such as a layer, a region, or a substrate, is referred to as being "on" another element, it may be "directly on" the other element or one or more intervening elements may be present. Like reference numerals designate like elements throughout the specification.

Figure 2:
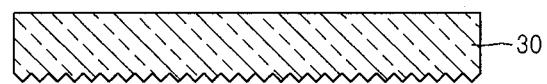
FIG. 2 is a cross-sectional view of a blocking plate of the laser annealing apparatus illustrated in FIG. 1.
Figure 3:
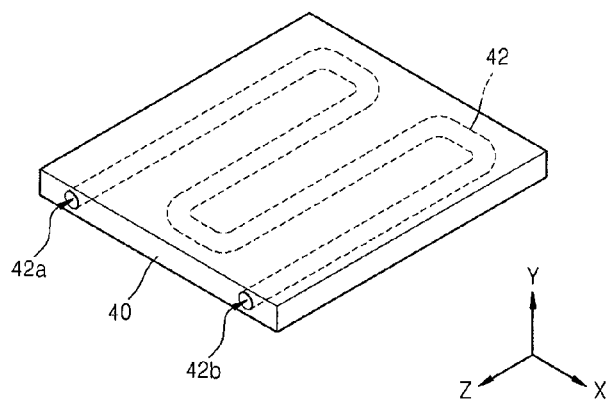
FIG. 3 is a perspective view of a cooling unit of the laser annealing apparatus illustrated in FIG. 1.

FIG. 1 is a conceptual (e.g., schematic) view of a laser annealing apparatus according to an embodiment of the present invention. FIG. 2 is a cross-sectional view of a blocking plate 30 of the laser annealing apparatus illustrated in FIG. 1. FIG. 3 is a perspective view of a cooling unit 40 of the laser annealing apparatus illustrated in FIG. 1.

The laser annealing apparatus according to the current embodiment includes a lens unit 10, a lens unit housing 20, the blocking plate 30, and the cooling unit 40.

The lens unit 10 may transmit a laser beam 12 to be irradiated onto an irradiation target (e.g., the laser beam 12 may be emitted to a substrate 100). The lens unit 10 may include a projection lens. The laser beam 12 to be incident on (e.g., incident to) and be irradiated from the lens unit 10 may be formed when a laser beam 11 generated by a laser beam generating apparatus is reflected by, for example, a reflector 1.

The lens unit housing 20 accommodates the lens unit 10 and has openings 22 and 24 through which the laser beam 12 may pass. The opening 22 may allow the laser beam 12 reflected from the reflector 1 to be incident on the lens unit 10, and the opening 24 may allow the laser beam 12 that is transmitted through the lens unit 10 to be emitted outside the lens unit housing 20.

The laser beam 12 transmitted through the lens unit 10 crystallizes amorphous silicon into polysilicon. That is, in some embodiments, the laser beam 12 is incident on amorphous silicon of the substrate 100 and thus amorphous silicon is, for example, repeatedly melted and solidified to be crystallized into polysilicon.

When amorphous silicon of the substrate 100 is repeatedly melted and solidified due to irradiation of the laser beam 12, as described above, since silicon in a melted state has a high reflectivity, the irradiated laser beam 12 is mostly reflected by melted silicon. A laser beam 13 reflected from the irradiation target (e.g., melted silicon) may proceed toward the lens unit 10, the lens unit housing 20, and/or the laser annealing apparatus and may influence (e.g., damage) a corresponding part thereof, and thus needs to be blocked or partially blocked.

The blocking plate 30 may block at least a portion of the laser beam 13 reflected from the irradiation target (e.g., melted silicon) after the laser beam 12 is transmitted through and emitted from the lens unit 10 and reaches silicon of the irradiation target, e.g., the substrate 100. Since, in some embodiments, the blocking plate 30 should block only the laser beam 13 reflected from the irradiation target and should not block the laser beam 12 emitted from the lens unit 10 and proceeding toward the irradiation target, the laser beam 12 transmitted through and emitted from the lens unit 10 and reaching the irradiation target is incident on the irradiation target at an incident angle (e.g., an angle of incidence) other than 0°. For example, in some embodiments, the laser beam 12 is not perpendicularly incident thereon the irradiation target (e.g., the substrate 100). The blocking plate 30 may be located below the lens unit housing 20 and may block (or partially block) the laser beam 8 reflected from the irradiation target from proceeding toward the lens unit housing 20 or the lens unit 10.

Instead of, or in addition to, blocking the laser beam 13 reflected from the irradiation target, the blocking plate 30 may also scatter (e.g., dissipate) the laser beam 13. To accomplish this, as illustrated in FIG. 2, a surface of the blocking plate 30, e.g., the surface on which the laser beam 8 reflected from the irradiation target is incident, may be embossed (e.g., the surface may have a rough texture). Because, in some embodiments, the embossing process is irregularly performed (e.g., the surface has an irregular texture), when the laser beam 13 reflected from the irradiation target is incident on the blocking plate 30, it may be reflected and/or diffused and thus its influence on another part or parts of the laser annealing apparatus may be minimized or reduced, and thereby damage to the laser annealing apparatus may be prevented or reduced.

The cooling unit 40 is located between the blocking plate 30 and the lens unit housing 20. The cooling unit 40 minimizes or reduces an influence of the laser beam 13 reflected from the irradiation target on the lens unit housing 20 or the lens unit 10.

In more detail, when the laser beam 13 reflected from the irradiation target is incident on the blocking plate 30, since the temperature of the blocking plate 30 itself is greatly increased by the laser beam 8, the lens unit housing 20 or the lens unit 10 is influenced (e.g., damaged) by the high-temperature blocking plate 30 due to, for example, radiation (e.g., thermal radiation). In this case, the lens unit housing 20 or the lens unit 10, which requires very accurate alignment, may be out of alignment, or an overall accuracy of the laser annealing apparatus may be reduced because the increase in temperature of the blocking plate 30 influences optical characteristics of the lens unit 10.

Because, in some embodiments, the cooling unit 40 is located between the blocking plate 30 and the lens unit housing 20 as described above, regardless of the temperature (e.g., high temperature) of the blocking plate 30, the influence of (e.g., damage from) radiation (e.g., thermal radiation) from the blocking plate 30 on the lens unit housing 20 or the lens unit 10 may be effectively prevented, minimized or reduced. As a result, overall accuracy of the laser annealing apparatus may be maintained (e.g., constantly maintained).

The cooling unit 40 may have various configurations, and more particularly, may have a configuration including a fluidic channel 42 having an inlet 42a and an outlet 42b as illustrated in FIG. 3. Since, in some embodiments, cooling air or cooling water flows through the fluidic channel 42, despite the increase in temperature of the blocking plate 30, performance of the cooling unit 40 may be maintained (e.g., constantly maintained).

Figure 4:
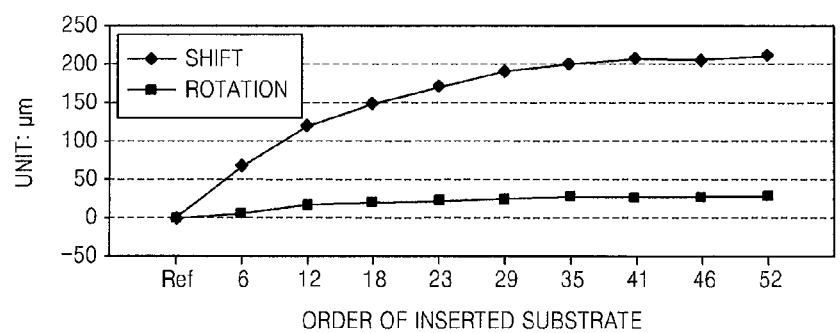
FIG. 4 is a graph showing an error rate in a case when a laser annealing apparatus according to a comparative example is used.

FIG. 4 is a graph showing an error rate that results when a laser annealing apparatus according to a comparative example is used, and more particularly, in a case when laser annealing is performed for 20 sec. after a substrate is provided to the laser annealing apparatus. In FIG. 4, the horizontal axis represents an order of a provided substrate (e.g., the number of substrates provided to the laser annealing apparatus), and a vertical axis represents a position variation, e.g., drift (e.g., shift or rotation), (unit: μm) of a laser beam.

Referring to FIG. 4, because heat generated by a blocking plate accumulatively influences a lens unit or a lens unit housing and thus reduces accuracy of the laser annealing apparatus, on subsequent substrates, the laser beam incident on the substrate is greatly shifted or rotated. In more detail, on a substrate provided in a $52^{nd}$ order (e.g., the $52^{nd}$ substrate provided), the laser beam to the substrate is shifted by 210 μm and is rotated by 28 μm. Such a reduction in accuracy of irradiating a laser beam to the substrate inevitably causes a reduction in quality of crystallizing amorphous silicon into polysilicon, such as, for example, an increased deviation in electrical characteristics. Thus performance of a thin film transistor (TFT) liquid crystal display (LCD) device or an active organic light-emitting display device manufactured by using the above-described polysilicon is inevitably reduced.

Figure 5:
FIG. 5 is a graph showing an error rate in a case when the laser annealing apparatus illustrated in FIG. 1 is used.

FIG. 5 is a graph showing an error rate that results when the laser annealing apparatus according to the current embodiment of the present invention is used. Referring to FIG. 5, in comparison to a case when the comparative example laser annealing apparatus is used, when the laser annealing apparatus according to the current embodiment of the present invention is used, the laser beam incident on the substrate is much less shifted or rotated. In more detail, when the laser annealing apparatus according to the current embodiment is used, on a substrate provided in a $52^{nd}$ order (e.g., the $52^{nd}$ substrate provided to the laser annealing apparatus), the laser beam incident on the substrate is shifted by 103 µm and is rotated by 10 µm, which shows that an error rate of the current embodiment is greatly reduced in comparison to a case when the comparative example laser annealing apparatus is used. Accordingly, when the laser annealing apparatus according to the current embodiment of the present invention is used, polysilicon having uniform electrical characteristics may be formed (e.g., crystallized) and thus an error rate of a TFT LCD device or an active organic light-emitting display device manufactured by using the above-described polysilicon may be greatly reduced (e.g., performance of such device may be greatly improved).

Figure 6:
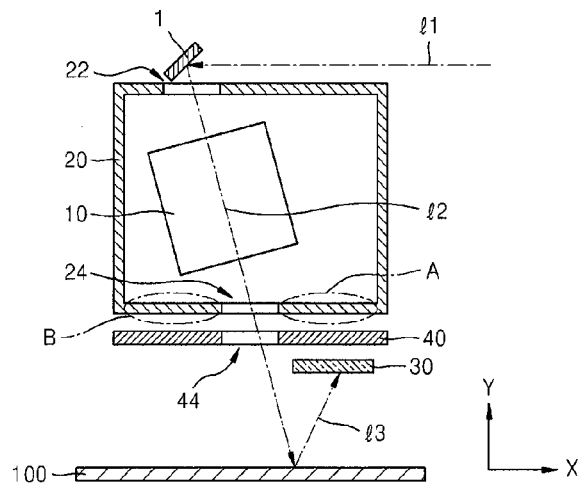
FIG. 6 is a schematic view of a laser annealing apparatus according to another embodiment of the present invention.
Figure 7:
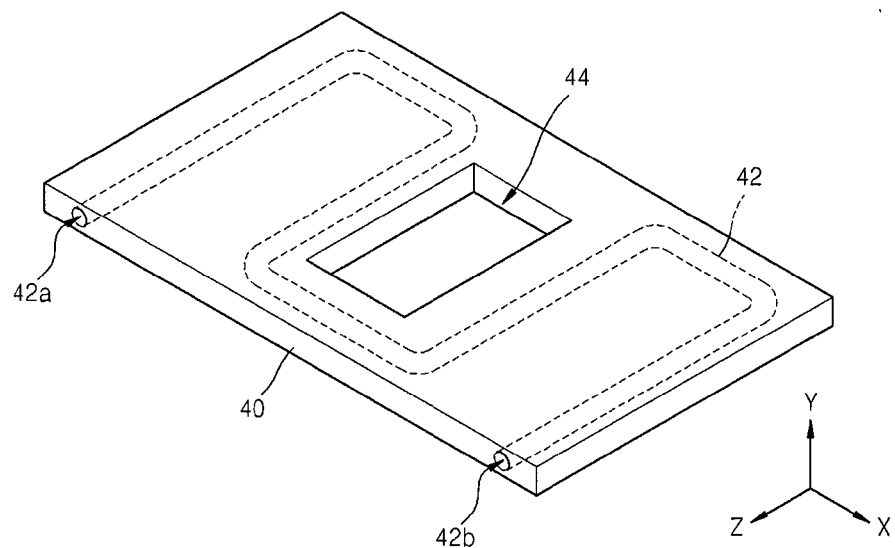
FIG. 7 is a perspective view of a cooling unit of the laser annealing apparatus illustrated in FIG. 6.

FIG. 6 is a conceptual (e.g., schematic) view of a laser annealing apparatus according to another embodiment of the present invention. FIG. 7 is a perspective view of the cooling unit 40 of the laser annealing apparatus illustrated in FIG. 6.

The laser annealing apparatus according to the current embodiment is different from the laser annealing apparatus according to the previous embodiment shown in FIG. 1 in terms of the shape of the cooling unit 40. The cooling unit 40 of the laser annealing apparatus according to the current embodiment has a plate shape having an opening 44 corresponding to the opening 24 of the lens unit housing 20 as illustrated in FIGS. 6 and 7. In this embodiment, the cooling unit 40 may also include the fluidic channel 42 having the inlet 42a and the outlet 42b.

In the laser annealing apparatus according to the current embodiment, the cooling unit 40 protects not only a portion A (shown in FIG. 6) of the lens unit housing 20, which corresponds to the blocking plate 30 located below the lens unit housing 20, from the blocking plate 30, but the cooling unit 40 also protects almost a whole lower side of the lens unit housing 20 including another portion B (shown in FIG. 6), other than the opening 24 of the lens unit housing 20, from a side below the lens unit housing 20. As such, since radiant heat proceeding from the blocking plate 30 directly to the portion A of the lens unit housing 20, which corresponds to the blocking plate 30, and radiant heat proceeding from the blocking plate 30 to the other portion B of the lens unit housing 20 are blocked (e.g., partially blocked), performance of the laser annealing apparatus may be further maintained (e.g., firmly maintained).

If the cooling unit 40 has the opening 44 so as to allow the laser beam 12 to proceed toward the irradiation target through the opening 44 as described above, in order to allow the cooling unit 40 not to block irradiation of the laser beam 12 (e.g., to allow the laser beam 12 to pass through the opening 44) when a direction or an angle of irradiating the laser beam 12 is changed, a cooling unit location adjusting unit for adjusting a location of the cooling unit 40 to change the location of the opening 44 (e.g., to vary the location of the cooling unit 40 with respect to the laser beam 12) may be further included.

Figure 8:
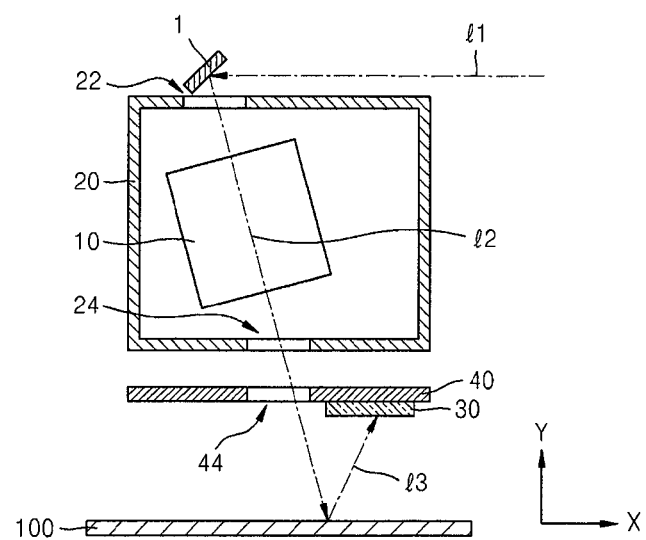
FIG. 8 is a schematic view of a laser annealing apparatus according to another embodiment of the present invention.

Although the cooling unit 40 is located between the lens unit housing 20 and the blocking plate 30 and is spaced apart from the blocking plate 30 in FIGS. 1 and 6, the present invention is not limited thereto. For example, FIG. 8 is a conceptual (e.g., schematic) view of a laser annealing apparatus according to another embodiment of the present invention. As illustrated in FIG. 8, the cooling unit 40 may surface-contact (e.g., directly contact) the blocking plate 30 at a side of the opening 44 (+x direction), e.g., at the side of the opening 44 corresponding to the A portion of the lens unit housing 20 shown in FIG. 6. As such, a rapid increase in temperature of the blocking plate 30 due to the reflected laser beam 13 may be prevented or reduced and thus an influence of heat on the lens unit 10 or the lens unit housing 20 may be prevented or reduced.

The above principle may be applied to not only an embodiment when the cooling unit 40 has the opening 44 but also a case when the cooling unit 40 does not have an opening as illustrated in FIG. 1. That is, in any of the above embodiments, the cooling unit 40 may contact (e.g., directly contact) a surface of the blocking plate 30 facing toward the lens unit housing 20.

In the laser annealing apparatus, although it is appropriate or suitable to prevent or reduce an increase in temperature of the blocking plate 30, aspects of embodiments of the present invention are directed toward minimizing or reducing an influence of a temperature variation of the blocking plate 30 on the lens unit 10 or the lens unit housing 20. Accordingly, unlike FIG. 8, the cooling unit 40 may surface-contact (e.g., directly contact) a lower surface of the lens unit housing 20 (-y direction) so as to allow the lens unit housing 20 and the lens unit 10 inside the lens unit housing 20 to be maintained at a constant temperature, and thus accuracy of the laser annealing apparatus may be maintained (e.g., constantly maintained).

Figure 9:
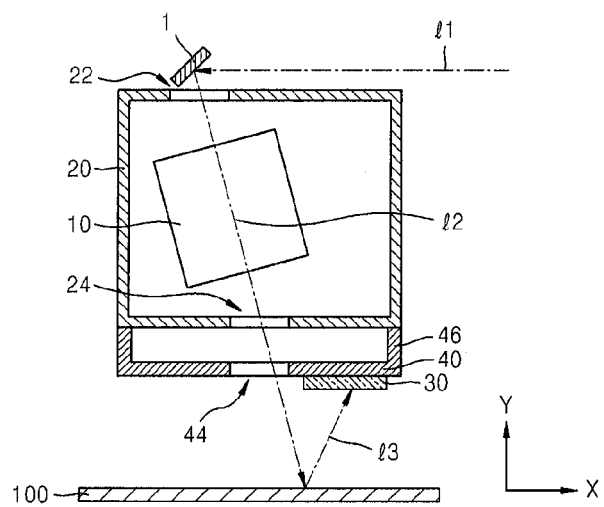
FIG. 9 is a schematic view of a laser annealing apparatus according to another embodiment of the present invention.
Figure 10:
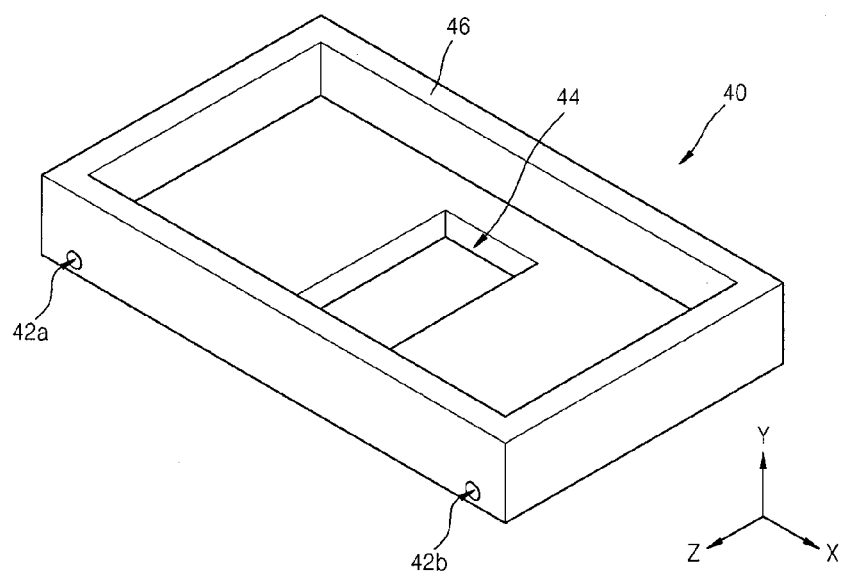
FIG. 10 is a perspective view of a cooling unit of the laser annealing apparatus illustrated in FIG. 9.

For example, FIG. 9 is a conceptual (e.g., schematic) view of a laser annealing apparatus according to another embodiment of the present invention. FIG. 10 is a perspective view of a cooling unit 40 of the laser annealing apparatus illustrated in FIG. 9.

In the laser annealing apparatus according to the current embodiment, the cooling unit 40 includes a housing contact unit 46 protruding from edges of the cooling unit 40 toward the lens unit housing 20 (+y direction) and contacting (e.g., directly contacting) the lens unit housing 20. For example, the housing contact unit 46 may surround the edges of the cooling unit 40. As such, the space between the lens unit housing 20 and the cooling unit 40, other than the opening 44 of the cooling unit 40 or the opening 24 of the lens unit housing 20, may be protected from an external environment. Thus, penetration of impurities into the lens unit housing 20 during, for example, a laser annealing process, may be effectively prevented or reduced.

Figure 11:
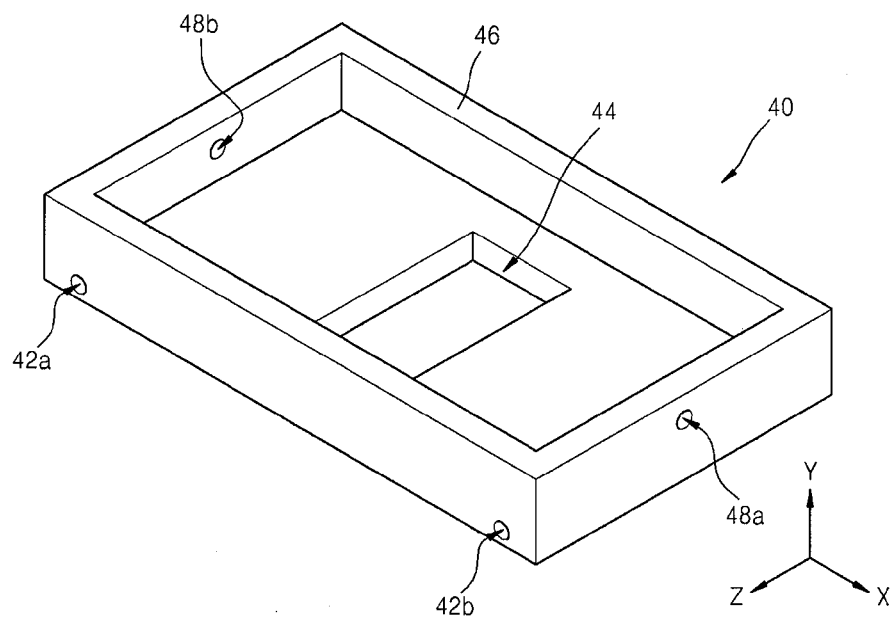
FIG. 11 is a perspective view of a cooling unit of a laser annealing apparatus according to another embodiment of the present invention.

FIG. 11 is a perspective view of a cooling unit 40 of a laser annealing apparatus according to another embodiment of the present invention. As illustrated in FIG. 11, the cooling unit 40 may have purging gas inlets 48a and 48b and a purging gas such as, for example, nitrogen may be supplied into the space between the cooling unit 40 and the lens unit housing 20 through a purging line connected to the purging gas inlets 48a and 48b. Since the purging gas is discharged later through, for example, the opening 44 of the cooling unit 40, penetration of impurities from a lower side of the cooling unit 40 through the opening 44 of the cooling unit 40 toward the lens unit 10 may be prevented (e.g., firmly prevented) or reduced. As illustrated in FIG. 11, the purging gas inlets 48a and 48b may be formed in the housing contact unit 46 and may allow the purging line to purge the space between the cooling unit 40 and the lens unit housing 20 via the housing contact unit 46.

As described above, according to embodiments of the present invention, a laser annealing apparatus capable of minimizing or reducing an error rate due to a laser beam reflected during laser annealing may be achieved. However, the present invention is not limited thereto.

While the present invention has been particularly shown and described with reference to certain exemplary embodiments thereof, it will be understood by those of skill in the art that various changes in form and details may be made therein without departing from the spirit and scope of the present invention as defined by the following claims, and equivalents thereof.

What is claimed is:

1. A laser annealing apparatus comprising:
   a lens unit configured to transmit a laser beam to be irradiated onto an irradiation target;
   a lens unit housing accommodating the lens unit and having an opening configured to allow the laser beam to pass through the opening;
   a blocking plate configured to block at least a portion of the laser beam reflected by the irradiation target after being transmitted through the lens unit to the irradiation target; and
   a cooling unit between the blocking plate and the lens unit housing.

2. The laser annealing apparatus of claim 1, wherein the laser beam transmitted through the lens unit is incident on the irradiation target at an incident angle other than 0°.

3. The laser annealing apparatus of claim 2, wherein the blocking plate is below the lens unit housing and at least partially blocks the laser beam reflected by the irradiation target from proceeding toward the lens unit housing.

4. The laser annealing apparatus of claim 3, wherein the cooling unit comprises a fluidic channel having an inlet and an outlet.

5. The laser annealing apparatus of claim 3, wherein the cooling unit has a plate shape having an opening corresponding to the opening of the lens unit housing.

6. The laser annealing apparatus of claim 5, wherein the cooling unit surface-contacts the blocking plate at a side of the opening of the lens unit.

7. The laser annealing apparatus of claim 5, wherein the cooling unit comprises a housing contact unit protruding from edges of the cooling unit toward the lens unit housing and contacting the lens unit housing.

8. The laser annealing apparatus of claim 7, wherein the housing contact unit surrounds the edges of the cooling unit.

9. The laser annealing apparatus of claim 8, further comprising a purging line for purging a space between the cooling unit and the lens unit housing with a purging gas.

10. The laser annealing apparatus of claim 9, wherein the purging line purges the space between the cooling unit and the lens unit housing via the housing contact unit.

11. The laser annealing apparatus of claim 5, further comprising a cooling unit location adjusting unit configured to adjust a location of the cooling unit to change the location of the opening of the cooling unit.

12. The laser annealing apparatus of claim 3, wherein the cooling unit contacts a surface of the blocking plate facing the lens unit housing.

* * * * *